United States Patent [19]

Allen

[11] Patent Number: 5,269,041
[45] Date of Patent: * Dec. 14, 1993

[54] REMOTE CONTROLLED SLUDGE REMOVAL APPARATUS

[76] Inventor: Henry W. Allen, P.O. Box 77966, Baton Rouge, La. 70809

[*] Notice: The portion of the term of this patent subsequent to Aug. 18, 2009 has been disclaimed.

[21] Appl. No.: 829,475

[22] Filed: Feb. 3, 1992

Related U.S. Application Data

[63] Continuation-in-part of Ser. No. 504,418, Jun. 13, 1990, Pat. No. 5,138,741.

[51] Int. Cl.$^5$ ................................................ B08B 9/08
[52] U.S. Cl. ........................................ 15/340.1; 15/1.7; 15/3; 15/93.1
[58] Field of Search ................. 15/1.7, 3, 49.1, 50.1, 15/93.1, 340.1, 340.3, 340.4, 246.5; 134/22.1, 8

[56] References Cited

U.S. PATENT DOCUMENTS

| | | | |
|---|---|---|---|
| 3,946,692 | 3/1976 | Sierra et al. | 15/1.7 |
| 4,162,680 | 7/1979 | Coch | 134/186 X |
| 4,223,622 | 9/1980 | Mazzucato | 15/338 |
| 4,407,035 | 10/1983 | Lindqvist | 15/93.1 |
| 4,407,678 | 10/1983 | Furness et al. | 134/167 R |
| 4,469,143 | 9/1984 | Vazin | 134/166 X |
| 4,685,974 | 8/1987 | Furness et al. | 134/181 X |
| 4,770,711 | 9/1988 | Deal, III et al. | 134/168 R |
| 4,777,971 | 10/1988 | Tribout et al. | 15/1.7 |
| 5,001,800 | 3/1991 | Parenti et al. | 15/1.7 |

Primary Examiner—Edward L. Roberts
Attorney, Agent, or Firm—David L. Ray

[57] ABSTRACT

A movable oil and oil sludge removal apparatus which can be inserted into the manhole of a storage and process tank, the apparatus including a platform, a pump connected to the platform, two track assemblies connected to the platform, tracks connected to each track assembly to drive the track assemblies, a motor for driving the track assemblies, and an auger apparatus connected to the track assemblies for cutting the sludge and channeling the sludge to the pump intake.

19 Claims, 4 Drawing Sheets

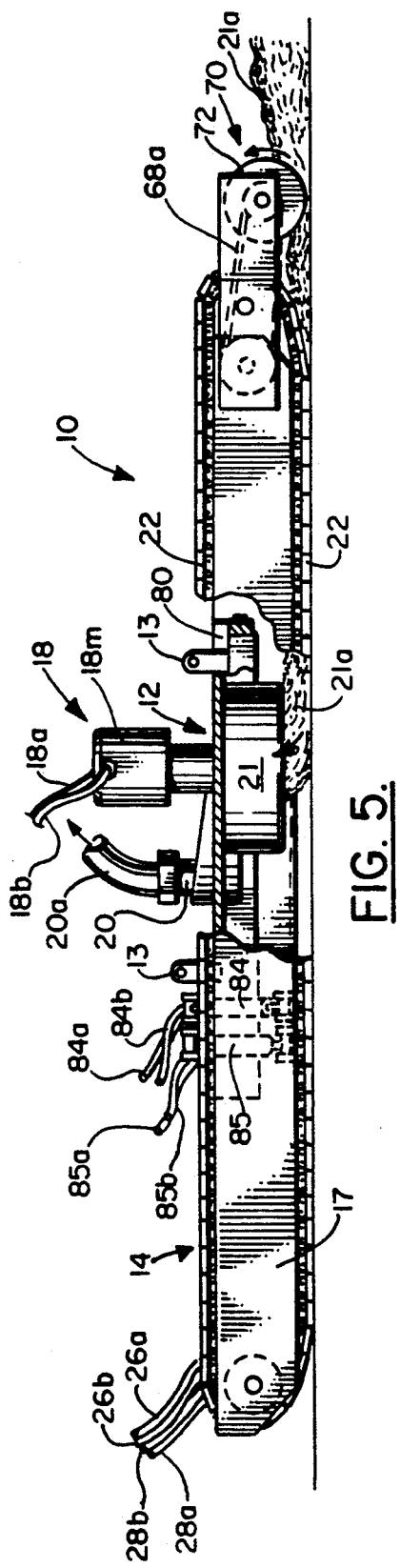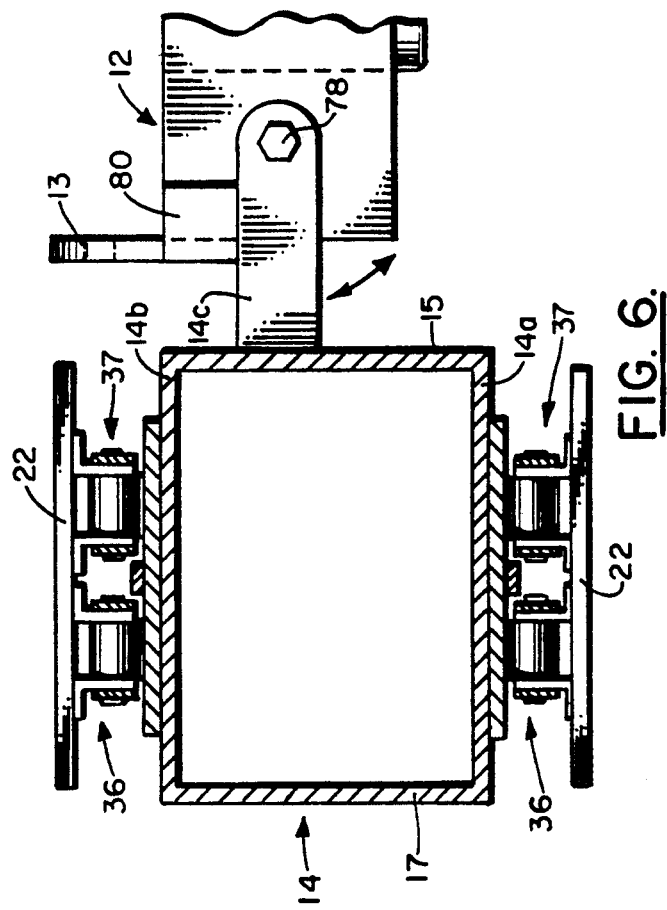
FIG. 5.
FIG. 6.

REMOTE CONTROLLED SLUDGE REMOVAL APPARATUS

CROSS REFERENCE TO RELATED APPLICATIONS

This application is a continuation-in-part of co-pending U.S. patent application Ser. No. 07/504,418 filed Jun. 13, 1990, now U.S. Pat. No. 5,138,741, for REMOTE CONTROLLED SLUDGE REMOVAL SYSTEM.

BACKGROUND OF THE INVENTION

1. Field of the Invention

The present invention is related to devices for cleaning storage tanks. In particular, the present invention is related to devices for removing oil and other sludge that accumulates in crude oil storage or process tanks.

2. Description of the Related Art

The accumulation of sludge in crude oil storage tanks and other liquid storage tanks is a problem faced by many companies and municipalities around the world that store crude oil before it is refined. Oil storage tanks must be cleaned periodically by manned crews usually shoveling out the sludge which accumulates on the bottom of the tank.

Cleaning oil or other liquid storage tanks is presently an arduous and hazardous task. As many as 15 or 20 people may be placed inside a tank to clean the sludge from the tank by hand and prepare the tank with hand tools for inspection or repair.

Placing workmen in a storage tank is very dangerous due to the flammability and volatility of oil and other liquids commonly stored in large tanks. Workers commonly must wear self-contained breathing equipment because the fumes from the chemicals stored in the tanks would suffocate or be toxic to the worker.

Commonly the access ports in the great majority of storage tanks are circular hatches or manholes which are commonly 24 inches in diameter. The size of the access port limits the size of any equipment used by the worker in cleaning the interior of a tank.

The following patents disclose art related to the present invention:

U.S. Pat. No. 4,770,711 discloses a method for cleaning chemical sludge deposits of oil storage tanks with a fluidizing agent, the tank having a floor, a side wall and a passageway through the side wall positioned adjacent the floor of the tank comprises a frame having a central portion and first and second end portions. The frame is configured and dimensioned to pass through the passageway. A pair of independently movable endless chain belts are position on opposite sides of the frame for selectively moving the frame within the oil storage tank to selected locations. A hydraulic line coupled to the central portion of the frame discharges the fluidizing agent onto an adjacent first portion of the sludge deposit so as to form a pool of sludge and fluidizing agent. A suction pump is positioned on the central portion of the frame for drawing up the poll of sludge and fluidizing agent. A suction pump is positioned on the central portion of the frame for drawing up the pool of sludge and fluidizing agent. A plurality of nozzles disposed adjacent the first end portion of the frame are in fluid communication with the suction pump so as to provide pressurized agitation and discharging of the pool of sludge and fluidizing agent onto a second portion of the sludge deposit adjacent said first end portion of the frame so as to dislodge and also aid in liquefying the second portion of the sludge deposit. The chain belts and suction pump are driven preferably by a pair of separately operable hydraulic motors supported on the frame.

U.S. Pat. No. 4,685,974 discloses a method for clearing settled sludge from the bottom of a storage tank uses a machine including a central body rotatable about which is a casing provided with two substantially diametric nozzles arranged so that liquid emerging therefrom sweeps substantially only in one plane, a turbine rotating the casing about the central body and half cylinder ensuring that when the casing is continuously rotated, alternately the nozzle is closed for substantially 180° rotation while the other nozzle is open. Such machines may be suspended above the floor of the tank adjacent to a wall thereof. Liquid is emitted from the nozzles in a sweep substantially parallel to the bottom plane of the storage tank, thereby re-suspending the sludge which thereafter is withdrawn as a suspension.

U.S. Pat. No. 4,469,143 discloses a tank truck purging system to permit access for repair, or maintenance without environmental pollution or hazard to workmen entering the tank. In accordance with the invention an elongated cylindrical storage tank is tilted about its horizontal axis, to form a reservoir for purge water. The tank is connectable as by flexible hoses to fill and drain connections for a tank compartment of a truck, rail car, or other bulk liquid vehicle. Purge water is pumped from the storage tank at a level above the lower tilted end of the elongated tank and vapor displaced from the tank compartment by the water is recovered through a vapor recovery system. Desirably, the compartment is filed until it overflows into the vapor recovery line. Water is returned to the storage tank at a position near the upwardly tilted end. The tilted arrangement permits gravity separation and accumulation of minor amounts of light hydrocarbons, such as diesel fuel or gasoline at an upper separation zone formed by the upwardly tilted end. A similar separation zone or volume for accumulation of rust particles, sludge and the like is formed at the lower tilted end. Hydrocarbons lighter than water are flushed from the tilted upper end of the reservoir tank by adding water to the reservoir tank so that it overflows through a line connected to a separator tank. Heavy particles from the lower tilted end are removed through a cleanout line entering near the lower tilted end are removed through a cleanout line entering near the lower tilted end of the reservoir tank. Water may also be removed from the tank to lower the water level at the upper tilted end to increase the surface area of the separation zone for accumulation of such lighter hydrocarbons.

U.S. Pat. No. 4,407,678 discloses a sludge removal machine suitable for removing sludge from the bottom of a storage tank which comprises a central body rotatable about which is a casing provided with two substantially diametric nozzles arranged so that liquid emerging therefrom sweeps substantially only in one plane, a turbine rotation the casing about the central body and means ensuring that when the casing is continuously rotated, alternately one nozzle is closed for substantially 180° rotation while the other nozzle is open. Such machines may be suspended above the floor of the tank adjacent to a wall thereof.

U.S. Pat. No. 4,223,622 discloses a tanker desludging system in a marine vessel adapted to carry liquids such as crude oil which embodies a certain amount of solid residue, apparatus is provided for removing the latter from the vessel's storage tanks. The liquid crude is normally removed by a manifolded discharge conduits, each conduit being fixedly positioned with its inlet port spaced above the floor of the tank to withdraw liquid from the tank. A portable cleaning apparatus is provided to remove accumulated sludge and the like from the tank floor, which cleaning apparatus is adapted to engage a discharge conduit whereby to ingest sludge from the latter.

U.S. Pat. No. 4,162,680 discloses a non-polluting system for metal surface treatments of metals, e.g., in coating base metal parts with an adherent coating of zinc, cadmium or similar protective metal by means of wet impact plating or electroplating, or in chroming or phosphating metal surfaces. A preferred embodiment relates to a wet impact plating process wherein the several solutions used in preparing the work, in plating it and in rinsing it are individually segregated after use and re-used in consecutive plating cycles so that release of ecologically objectionable effluent is eliminated and chemical and metal components fed into the process are conserved instead of being discarded after each plating cycle.

U.S. Pat. No. 4,147,269 discloses a fuel oil storage tank which is a cylindrical vessel of large size and integral molded construction is provided having a depressed well which accumulates sludge formed in the course of storage of hydrocarbon fuels. A hole positioned in the top of the vessel directly above said well permits insertion of a pipe which, by suction means, positioned below the tank and adjacent each end, causes the entire vessel to be tilted downwardly toward the well, thereby causing gravimetric migration of sludge toward the well.

SUMMARY OF THE INVENTION

In accordance with the present invention there is provided method for cleaning storage tanks and a movable cleaning apparatus which can be inserted into the manhole of a storage tank, the apparatus including a platform, a pump connected to the platform, two track assemblies connected to the platform, tracks connected to each track assembly to drive the track assemblies, a motor for driving the track assemblies, and an auger apparatus connected to the track assemblies for cutting the sludge and channeling the sludge to the pump intake.

One of the principal advantages of the present invention is that no workmen or other personnel need be placed inside a tank being cleaned by the apparatus of the invention.

The apparatus of the invention has the further advantage of being easily insertable into the existing manhole or opening of a storage tank without the necessity of cutting a hole in the tank or otherwise modifying the structure of the tank.

The apparatus of the invention has the additional advantage of being useful to clean storage tanks containing chemicals other than crude oil, and remove the chemicals from the storage tank.

BRIEF DESCRIPTION OF THE DRAWINGS

The invention will be more easily understood by reference to the drawings in which:

FIG. 5 is a partly cut-away, side elevational view of the apparatus of the invention cleaning the bottom of a storage tank, and FIG. 6 is cross-sectional view taken along lines 6—6 of FIG. 1.

DESCRIPTION OF THE PREFERRED EMBODIMENTS

Figure 1:
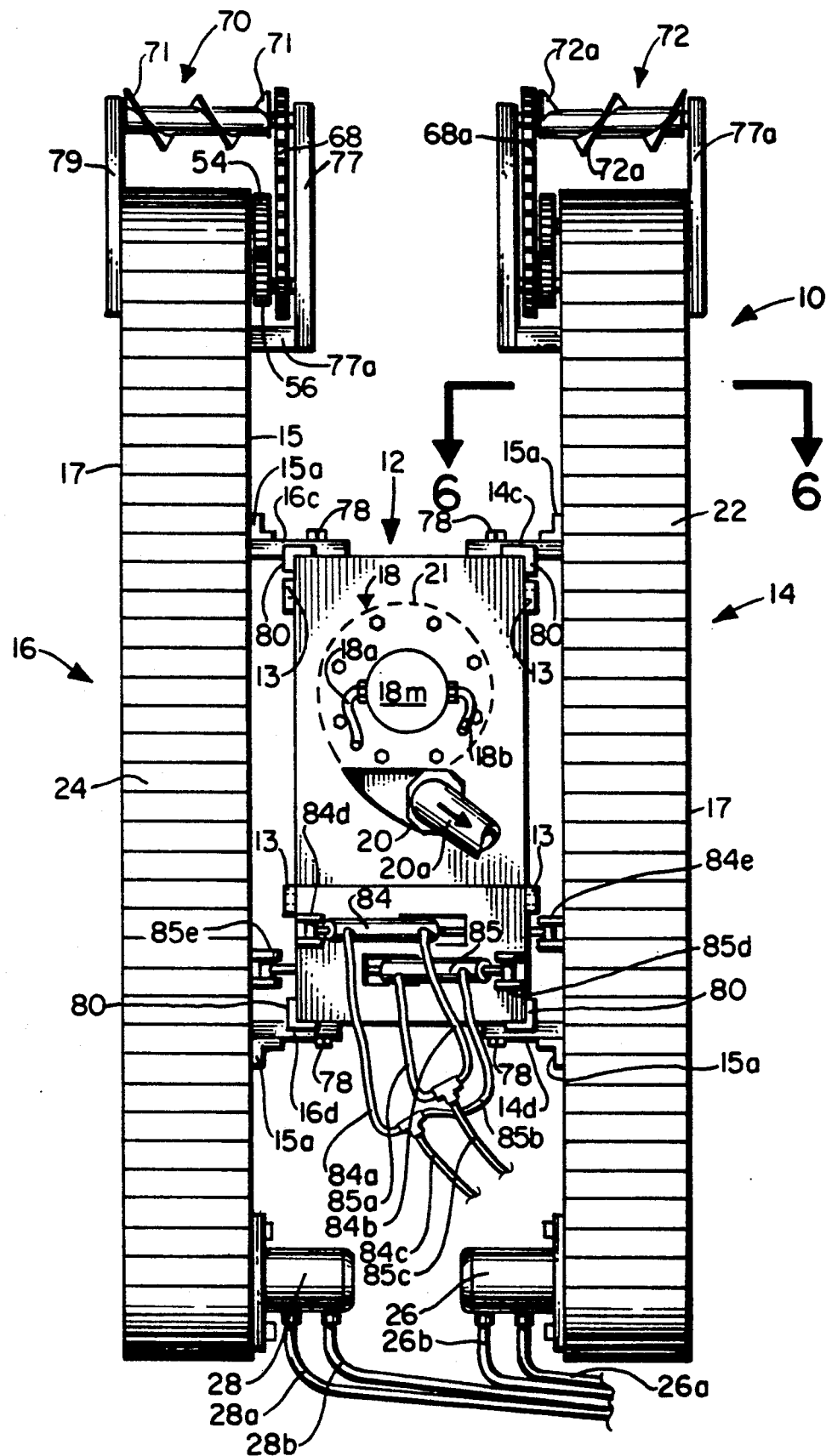
FIG. 1 is a schematic, partly cut-away top view of the sludge removal apparatus of the invention.

Referring now to the drawings, and in particular to FIG. 1 and FIG. 5, the sludge removal apparatus of the invention can be seen to be generally indicated by the numeral 10. By sludge is meant the viscous residue of hydrocarbons such as crude oil, or other sediment such as sewerage digester sediment, or sludge contained in sludge pits.

Figure 4:
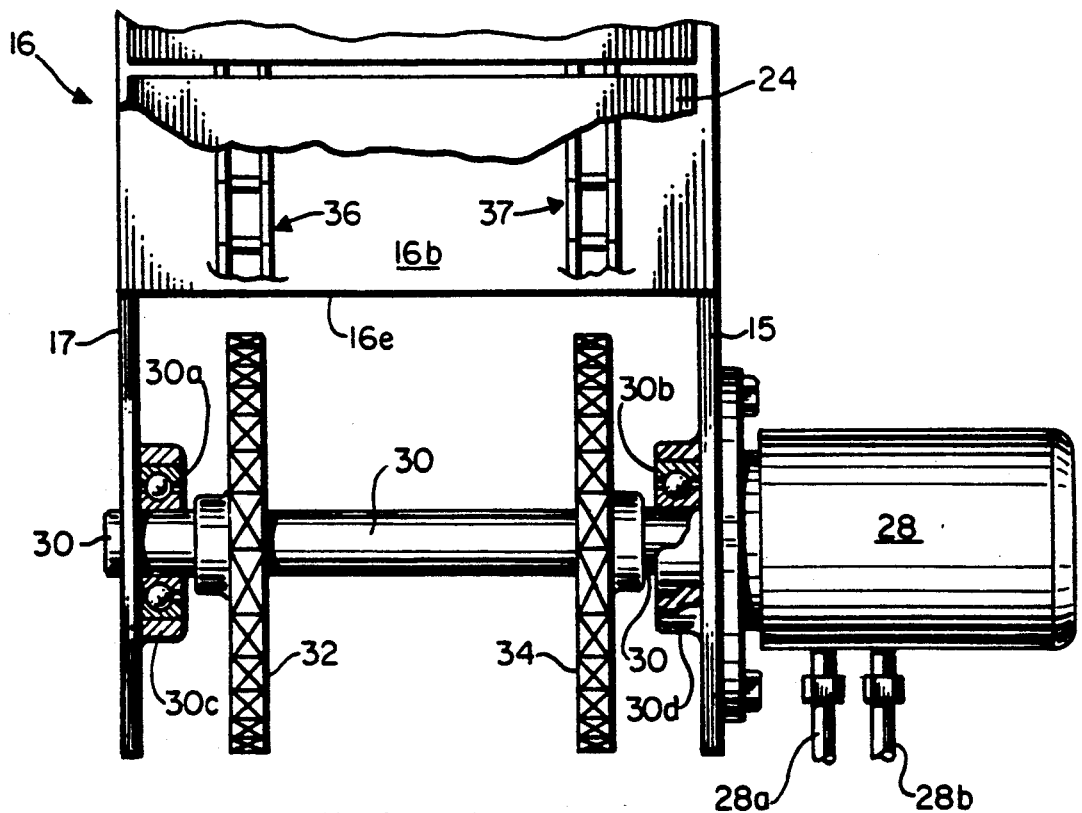
FIG. 4 is a schematic, enlarged, partly cut-away top view of the rear end of one track of the apparatus of the invention.

The sludge removal apparatus 10 includes a platform generally indicated by the numeral 12 which is connected to two track assemblies generally indicated by the numerals 14 and 16 having inside track assembly walls 15 and outside track assembly walls 17, respectively. Platform 12 has a plurality of eyes 13 rigidly connected thereto to which cables or ropes may be attached for raising or lowering sludge removal apparatus 10. Track assembly 14 has bottom 14a and top 14b as shown in FIG. 6, and track assembly 16 has a bottom (not shown) identical to bottom 14a and a top 16b shown in FIG. 2. In FIG. 4, the rear edge 16e of top 16b of track assembly 16, is shown not touching rear sprockets 32 and 34. The tops 14b and 16b and the bottoms 14a and 16a of track assemblies 14 and 16 extend between, but do not touch, the front sprockets 44 and 46, and the rear sprockets 32 and 34. Mounted on platform 12 is a pump generally indicated by the numeral 18 having an electric, or preferably a hydraulic, motor 18m, discharge 20 and intake 21 connected thereto. A hose 20a may be connected to discharge 20 to convey sludge 21a from the inside of the tank being cleaned to holding tanks or the like on the outside. Sludge 21a inters intake 21 as shown in FIG. 5.

Pump 18 is preferably a submersible pump driven by a hydraulic motor 18m and is designed to pump viscous liquids such as crude oil sludge. Such pumps are well known in the art. Motor 18m may be operated while submerged in oil or water. Motor 18m is supplied with hydraulic fluid through hydraulic fluid hose 18a and hydraulic fluid exits through hydraulic hose 18b. Both hoses 18a and 18b extend to a hydraulic pump (not shown) on the outside of the tank being cleaned when the sludge removal apparatus 10 is placed in a tank to be cleaned. Hydraulic fluid flow through hydraulic hoses 18a and 18b can be controlled by valves (not shown) outside of the tank being cleaned and operated manually or by computers, microprocessors, or other programmable systems. Preferably, pump 18 is capable of pumping sludge containing up to twenty-five percent solids.

Connected to each of the track assemblies 14 and 16 are tracks 22 and 24, respectively. Tracks 22 and 24 can be made of steel coated with rubber or any other suitable material that will suit the chemical climate encountered in the tank which is being cleaned by the sludge removal apparatus 10 and prevent sparks. Electromagnets could be used if needed in the steel portion of the track to increase traction.

Tracks 22 and 24 are driven at their rear ends by motors 26 and 28, respectively. Motors 26 and 28 are preferably hydraulic motors which may be operated while submerged in oil or water. Motors 26a and 28a are supplied with hydraulic fluid through hydraulic fluid hoses 26a and 26a, respectively, and hydraulic fluid exits from motors 26 and 28 through hydraulic hoses 26b and 28b, respectively. All hoses 26a, 26b, 28a, and 28b extending to a hydraulic pump (not shown) on the outside of the tank being cleaned when the sludge removal apparatus 10 is placed in a tank to be cleaned. Hydraulic fluid flow through hydraulic fluid hoses 26a, 26b, 28a and 28b can be controlled by valves (not shown) outside of the tank being cleaned and operated manually or by computers, microprocessors, or other programmable systems.

In FIG. 4, hydraulic motor 28 can be seen to have axle 30 connected thereto and driven thereby. Axle 30 rotates in bearings 30a and 30b which are connected to walls 17 and 15 respectively by press fitting in rigid rings 30c and 30d located on the inside of walls 17 and 15. Axle 30 has sprockets 32 and 34 rigidly connected thereto. Preferably, sprockets 32 and 34 and all other sprockets are constructed of a material that will not produce sparks such as nylon. Sprockets 32 and 34 engage roller chains generally indicated by the numerals 36 and 37 connected inside track 24 to drive track 24 as is known in the art. Motor 26 and track 22 have an axle, sprockets, and roller chain inside track 22 which are identical to axle 30, sprockets 32 and 34 and roller chains 36 and 37, but they are not shown in the drawings for brevity.

Figure 2:
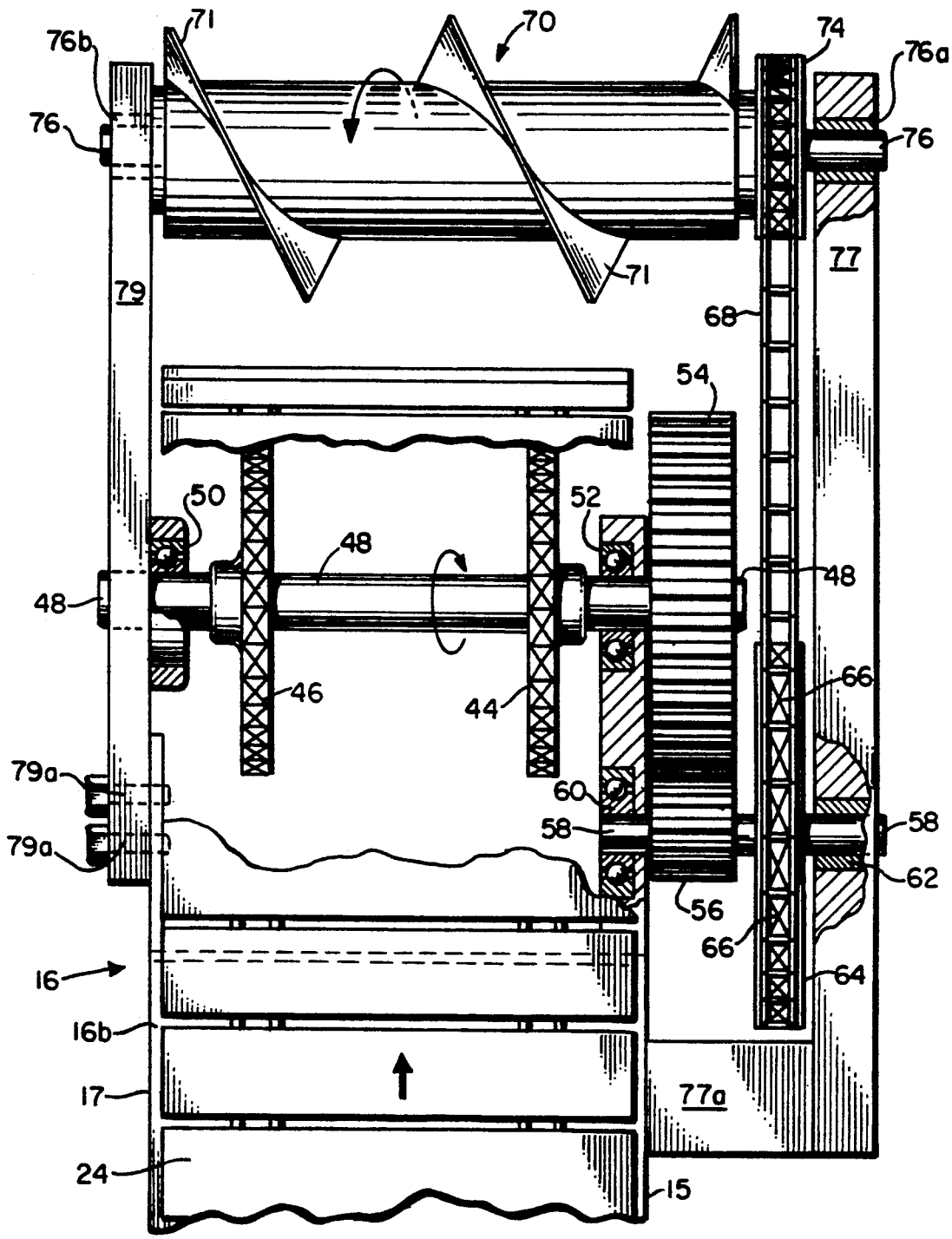
FIG. 2 is a schematic, enlarged, partly cut-away top view of the front end of one track of the apparatus of the invention.

Two sprockets 44 and 46 are shown in FIG. 2 to be located in the front of track 24 rigidly connected to axle 48 which is rotatably supported by ball bearings 50 and 52. Sprockets 44 and 46 are identical to sprockets 32 and 34 shown in FIG. 4 and are driven by roller chains (not shown) inside track 24.

Sprockets 44 and 46 drive axle 48 which is rigidly connected to gear 54 shown in FIG. 2. Gear 54 engages and drives gear 56 rigidly connected to axle 58 rotatably mounted in bearing 60 and bushing 62. When the sludge removal apparatus 10 is in operation, track 24 is moving in the direction shown by the arrow on track 24 in FIG. 2.

Rigidly connected to axle 58 adjacent to gear 56 is sprocket 64 which has teeth 66 that engage drive chain 68 which drives the auger cutter generally indicated by the numeral 70. Drive chain 68 engages sprocket 74 rigidly connected to axle 76 to cause axle 76 to rotate. Auger cutter 70 is rigidly connected to axle 76 and rotates therewith causing spiral blade 71 of auger cutter 70 to dig up sludge 21a located in the bottom of a storage tank as shown in FIG. 5. When the sludge removal apparatus 10 is in operation and track 24 is moving in the direction shown by the arrow on track 24 shown in FIG. 2, auger cutter 70 is turning in the direction shown by the arrow on auger cutter 70 shown in FIG. 2.

An auger support 77 connected to the inside wall 15 of track assembly 16 by auger support holder 77a holds axles 76 and 58 in bushings 62 and 76a. The end of axle 76 opposite from auger support 77 is supported by bushing 76b which is held in auger cutter support 79 which is connected to the outside wall 17 of track assembly 16 by bolts 79a.

An auger cutter generally indicated by the numeral 72 and having spiral blade 72a is located on the front of track 22 and is identical to auger cutter 70. The rotating auger cutters 70 and 72 cut the sludge 21a and force the sludge 21a to one side, preferably to the area between the track assemblies for intake by pump 18 and discharge to the outside of the tank 83 through hose 20a.

Figure 3:
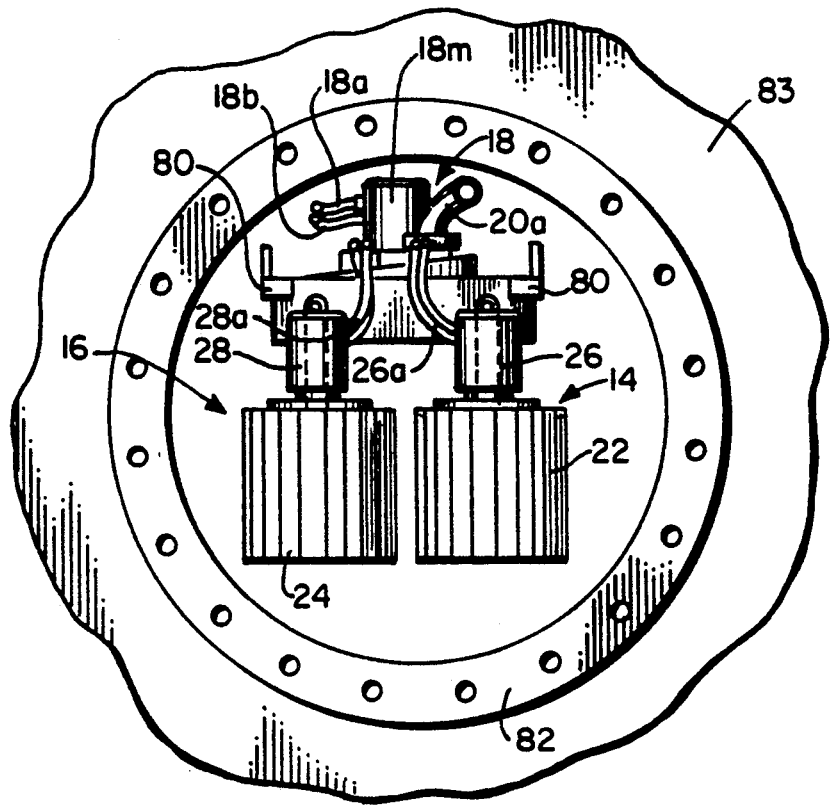
FIG. 3 is a schematic rear end view of the sludge removal apparatus of the invention folded for insertion into the manhole of a storage tank.

As can be seen in FIGS. 1 and 3, track assembly 14 has two track assembly support members 14c and 14d rigidly connected to inside wall 15 of track assembly 14 and track assembly 16 has two track assembly support members 16c and 16d connected to the inside wall of track assembly 16. L-shaped braces 15a are rigidly connected to both the inside wall 15 of track assembly 16 and 17 to strengthen the connection of members 14c, 14d, 16c, and 16d to track assemblies 14 and 16.

Support members 14c, 14d, 16c, and 16d can be rotated about pins 78—78 in platform 12. Stops 80—80 are rigidly connected to platform 12 to maintain track assemblies 14 and 16 in the working position shown in FIG. 1 after insertion of sludge removal apparatus 10 into a manhole 82 in storage tank 83 as shown in FIG. 3 which may be in the top or side of a tank having sludge 21a therein. Stops 80—80 stop track assemblies 14 and 16 when folded to the position shown in FIGS. 1 and 6.

Two hydraulic pistons or rams 84 and 85 shown in FIG. 1 can be used to pivot track assemblies 14 and 16 about pins 78—78 as shown by the arrow in FIG. 6. Hydraulic rams 84 and 85 are used to move or pivot track assemblies 14 and 16 from the position shown in FIGS. 1 and 5 to the position shown in FIG. 3.

Hydraulic ram 84 has hydraulic fluid supply hoses 84a and 84b connected thereto, and hydraulic ram 85 has hydraulic fluid supply hoses 85a and 85b connected thereto to control the operation of the rams 84 and 85. Hydraulic hoses 84a and 85b are both connected to hydraulic hose 84c and hydraulic hoses 85a and 84b are both connected to hydraulic hose 85c. Hydraulic hose 84c and hydraulic hose 85c extend to a hydraulic pump (not shown) on the outside of the tank being cleaned when the sludge removal apparatus 10 is placed in a tank to be cleaned. Hydraulic fluid flow through hydraulic fluid hoses 84c and 85c can be controlled by valves (not shown) outside of the tank being cleaned and operated manually or by computers, microprocessors, or other programmable systems. Hydraulic ram 84 is pivotally connected at 84d to platform 12 and to wall 15 of track assembly 14 at 84e, and hydraulic ram 85 is pivotally connected at 85d to platform 12 and to wall 15 of track assembly 16 at 85e.

An auger cutter cover may be placed over the auger cutters 70 and 72 if desired to prevent sludge 21a from being thrown upwardly. The auger cutters 70 and 72 allow a wider removal area than the pump 18 alone can give. Preferably, the auger cutters rotate in the direction indicated by the arrows in FIG. 2 and FIG. 5 when the sludge removal apparatus 10 is in operation and the tracks are turning in the direction indicated by the arrow in FIG. 5.

The sludge removal apparatus 10 may be equipped with pipe spray nozzles (not shown) or the like to apply solvents or similar substances to the auger cutters 70 and 72 for softening materials, and/or to the tank sidewalls and bottom. Furthermore, the sludge removal apparatus 10 of the invention may be operated completely submerged beneath oil or water.

Although the preferred embodiments of the present invention have been disclosed and described in detail above, it should be understood that the invention is in no sense limited thereby, and its scope is to be determined by that of the following claims:

What is claimed is:

1. A movable sludge pumping apparatus which can be inserted into the inside of a storage tank containing sludge through a conventional manhole in the storage tank, said movable pumping apparatus comprising:
   a. a platform,
   b. pump means rigidly connected to said platform for pumping sludge from said storage tank, said pump means having an intake means for receiving said sludge and a discharge means for discharging sludge from said pump means, said discharge means having hose means connected thereto to convey said pumped sludge from said tank,
   c. drive assembly means pivotally connected to said platform means for supporting and moving said platform means and said pump means around the inside of said storage tank to pump said sludge from selected areas of said storage tank, said drive assembly means being foldable beneath said platform means to enable said sludge pumping apparatus to be insertable into the manhole of said storage tank, and
   d. rotatable cutter means rotatably connected to said drive assembly means for cutting and channeling said sludge to said pump.

2. The apparatus of claim 1 wherein said drive assembly means comprise two track assemblies, each of which is adapted to fold beneath said platform means.

3. The apparatus of claim 2 wherein hydraulic ram means are connected to said track assemblies and said platform means to selectively fold said track assemblies beneath said platform means.

4. The apparatus of claim 3 wherein said hydraulic ram means have hydraulic hoses attached thereto for selectively actuating said hydraulic ram means, said hydraulic hoses extending outside of said tank.

5. The apparatus of claim 1 wherein track means are connected to said drive assembly means to propel said sludge pumping apparatus around the inside of said storage tank.

6. The apparatus of claim 5 wherein motor means is connected to said drive assembly means for driving said track means.

7. A movable sludge pumping apparatus which can be inserted into the inside of a storage tank containing sludge through a conventional manhole in the storage tank, said movable pumping apparatus comprising:
   a. a platform,
   b. pump means rigidly connected to said platform for pumping sludge from said storage tank, said pump means having an intake means for receiving said sludge and a discharge means for discharging sludge from said pump means,
   c. drive assembly means pivotally connected to said platform means for supporting and moving said platform means and said pump means around the inside of said storage tank to pump said sludge from selected areas of said storage tank, said drive assembly means being foldable beneath said platform means to enable said sludge pumping apparatus to be insertable into the manhole of said storage tank, said drive assembly means having track means connected thereto to propel said sludge pumping apparatus around the inside of said storage tank, said track assembly means having hydraulic motor means connected thereto for driving said track means, and
   d. rotatable cutter means rotatably connected to said drive assembly means for cutting and channeling said sludge to said pump.

8. The apparatus of claim 7 wherein said hydraulic motor has hydraulic hoses attached thereto for selectively actuating said hydraulic motor, which hoses extend outside of said tank.

9. The apparatus of claim 7 wherein said cutter means comprises rotatable auger means.

10. A movable pumping apparatus which can be inserted into the inside of a storage tank through a conventional manhole in said storage tank to pump the contents of said storage tank from said storage tank, said movable pumping apparatus comprising:
    a. a platform,
    b. pump means rigidly connected to said platform for pumping said contents of said storage tank from said storage tank, said pump means having an intake means for receiving said contents of said storage tank and a discharge means for discharging said contents of said storage tank from said pump,
    c. drive assembly means pivotally connected to said platform means for supporting and moving said platform means and said pump means around the inside of said storage tank to pump said contents of said storage tank from selected areas of said storage tank, said drive assembly means being foldable beneath said platform means to enable said pumping apparatus to be insertable into the manhole of said storage tank, said drive assembly means comprising two track assemblies, each of which is adapted to fold beneath said platform means, and
    d. rotatable cutter means rotatably connected to said drive assembly means for cutting and channeling said contents of said storage tank to said pump means.

11. The apparatus of claim 10 wherein hydraulic ram means are connected to said track assemblies and said platform means to selectively fold said track assemblies beneath said platform means.

12. The apparatus of claim 11 wherein said hydraulic ram means have hydraulic hoses attached thereto for selectively actuating said hydraulic ram means, said hydraulic hoses extending outside of said tank.

13. The apparatus of claim 10 wherein motor means is connected to said drive assembly means for driving said track assemblies.

14. The apparatus of claim 13 wherein said motor means is a hydraulic motor means.

15. The apparatus of claim 14 wherein said hydraulic motor has hydraulic hoses attached thereto for selectively actuating said hydraulic motor, which hoses extend outside of said tank.

16. The apparatus of claim 10 wherein said cutter means comprises rotatable auger means.

17. The apparatus of claim 10 wherein hose means is connected to said discharge means to convey said pumped sludge from said tank.

18. A movable pumping apparatus which can be inserted into the inside of a storage tank through a conventional manhole in said storage tank to pump the contents of said storage tank from said storage tank, said movable pumping apparatus comprising:
  a. a platform,
  b. pump means rigidly connected to said platform for pumping said contents of said storage tank from said storage tank, said pump means having an intake means for receiving said contents of said storage tank and a discharge means for discharging said contents of said storage tank from said pump,
  c. drive assembly means pivotally connected to said platform means for supporting and moving said platform means and said pump means around the inside of said storage tank to pump said contents of said storage tank from selected areas of said storage tank, said drive assembly means being foldable beneath said platform means to enable said pumping apparatus to be insertable into the manhole of said storage tank, said drive assembly means having track means connected thereto to propel said pumping apparatus around the inside of said storage tank, said drive assembly means having hydraulic motor means connected thereto for driving said track means, and
  d. rotatable cutter means rotatably connected to said drive assembly means for cutting and channeling said contents of said storage tank to said pump means.

19. A movable pumping apparatus which can be inserted into the inside of a storage tank through a conventional manhole in said storage tank to pump the contents of said storage tank from said storage tank, said movable pumping apparatus comprising:
  a. a platform,
  b. pump means rigidly connected to said platform for pumping said contents of said storage tank from said storage tank, said pump means having an intake means for receiving said contents of said storage tank and a discharge means for discharging said contents of said storage tank from said pump, said discharge means having hose means connected thereto to convey said pumped sludge from said tank,
  c. drive assembly means pivotally connected to said platform means for supporting and moving said platform means and said pump means around the inside of said storage tank to pump said contents of said storage tank from selected areas of said storage tank, said drive assembly means being foldable beneath said platform means to enable said pumping apparatus to be insertable into the manhole of said storage tank, and
  d. rotatable cutter means rotatably connected to said drive assembly means for cutting and channeling said contents of said storage tank to said pump means.

* * * * *